Feb. 26, 1935.　　　J. DENINSON　　　1,992,608
MONOSTEREOSCOPIC VISION
Filed April 23, 1930　　　3 Sheets-Sheet 1

Feb. 26, 1935.  J. DENINSON  1,992,608
MONOSTEREOSCOPIC VISION
Filed April 23, 1930   3 Sheets-Sheet 2

INVENTOR
Jacob Deninson
BY Mock & Blum
ATTORNEYS

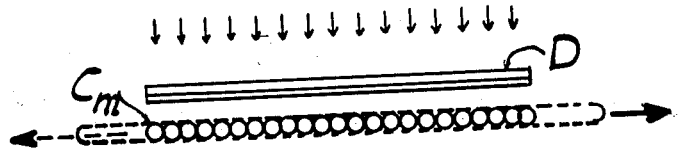
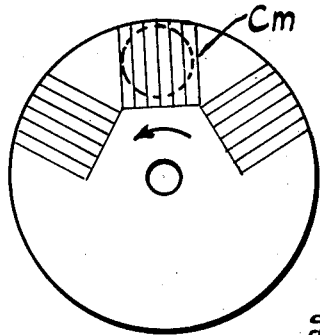
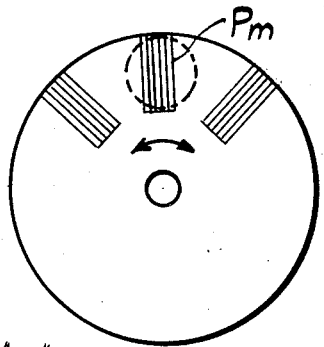
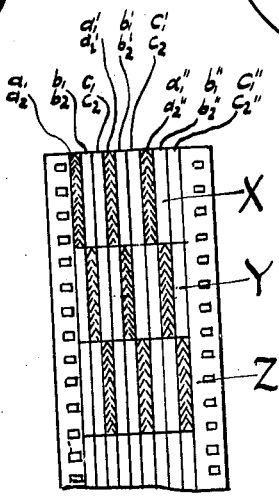

Patented Feb. 26, 1935

1,992,608

UNITED STATES PATENT OFFICE 1,992,608

MONOSTEREOSCOPIC VISION

Jacob Deninson, New York, N. Y.

Application April 23, 1930, Serial No. 446,485

5 Claims. (Cl. 40—137)

My invention relates to a new and improved method of and to a new and improved device for securing stereoscopic vision.

One of the objects of my invention is to provide an improved optical device for securing stereoscopic effects, so that it will be unnecessary to utilize two separate diapositives, or the like, and it will also be unnecessary to use the lens system of the well known stereoscope.

Another object of my invention is to provide a new and improved optical system for viewing a picture which is made up of consecutive strips, in which the alternate strips each comprise a series corresponding to the view of an object by the left eye and by the right eye.

Another object of my invention is to provide an optical system which shall utilize a series of cylinders made of transparent material in order to cause each eye of the observer to view the corresponding series of strips.

Another object of my invention is to provide a system by means of which a plurality of cylinders made of glass or other suitable transparent material, can be reciprocated or be otherwise moved with respect to the ordinary picture or to the composite picture which is to be viewed.

Other objects of my invention will be set forth in the following description and drawings which illustrate a preferred embodiment of my invention, it being understood that the above general statement of the objects of my invention is intended merely to generally explain the same and not to limit it in any manner.

Fig. 1 diagrammatically indicates the optical principles involved.

Figure 4:
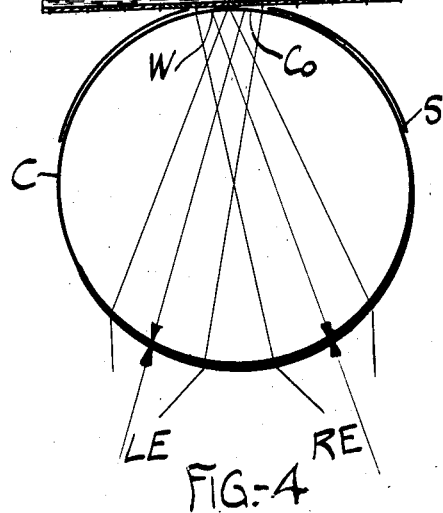

Fig. 4 also diagrammatically illustrates the optical principles involved.

Figure 5:
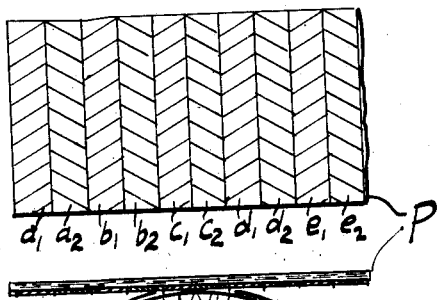

Fig. 5 diagrammatically illustrates the consecutive areas of the diapositive used. Said diapositive may be designated as a mono-stereoscopic diapositive.

Fig. 6 diagrammatically indicates a section of film made according to one embodiment of the invention.

Figs. 7, 8 and 9 respectively illustrate the relative movement of the transparent members, relative to the diapositive.

It has heretofore been suggested as in French Patent No. 344,522 to form a composite diapositive which will produce a stereoscopic effect when it is properly viewed. Such a diapositive comprises in effect a plurality of strips arranged in two different series. The alternate strips, such as Nos. 1, 3, 5, 7, etc. constitute one series, and the other alternate strips such as Nos. 2, 4, 6, 8, etc. constitute a second series. The first series corresponds to a view seen by one of the eyes of the observer, and the other series of strips correspond to a view seen by the other eye of the observer. The effect is the same as though the object were being rapidly and alternately viewed with one eye, and then with the other eye.

When a diapositive of this type is held so that the left eye only sees the strips corresponding thereto, and the right eye of the observer only sees the other strips corresponding thereto, the effect is the same as though two entirely different diapositives were being viewed by means of the well known lens system of a stereoscope.

I prefer to use a diapositive, that is, a transparent reproduction of the picture upon a glass plate or on a suitable transparent film.

Figure 1:
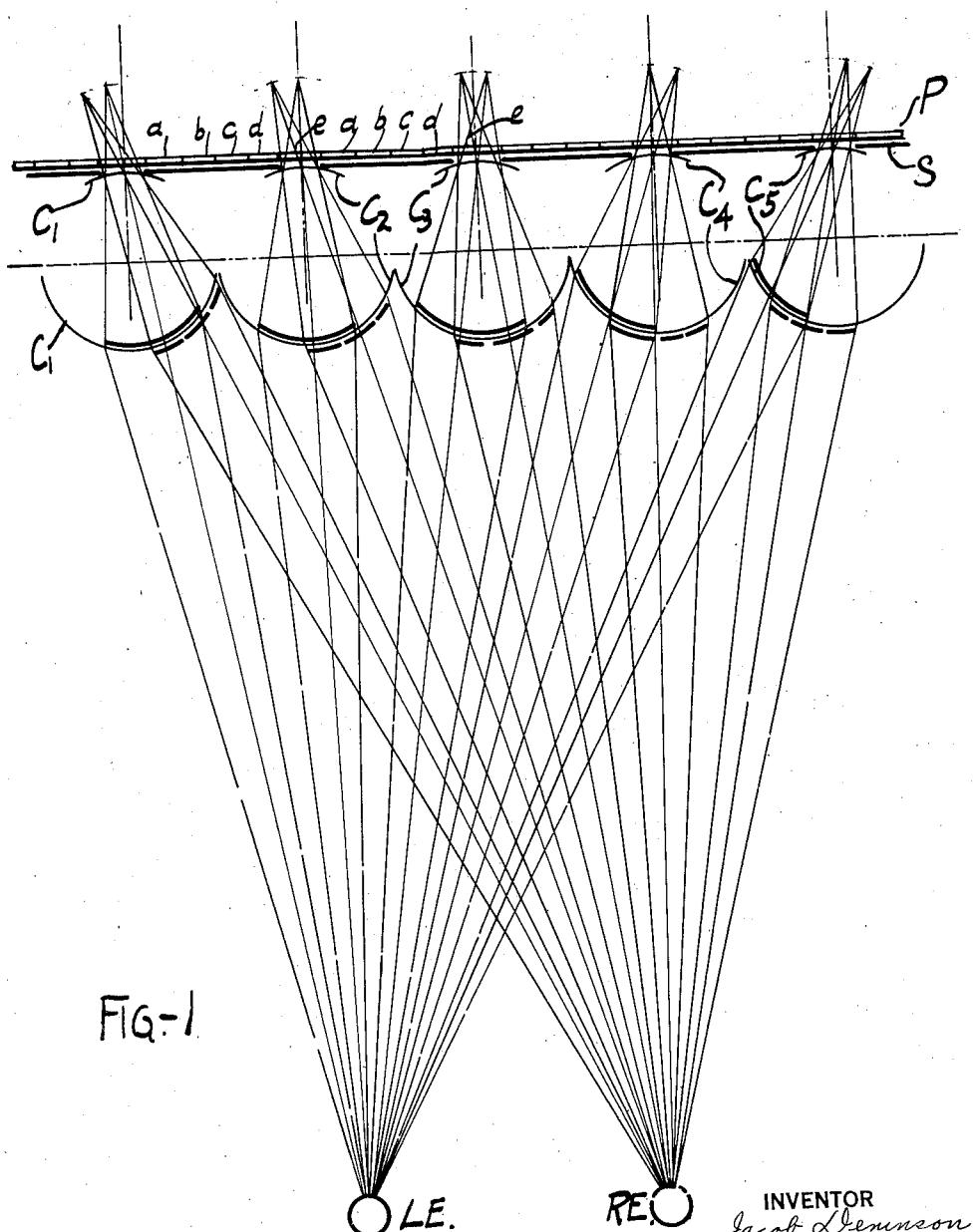

Considering Fig. 1, the diapositive P is represented as having been divided into narrow transverse strips of equal width. The axis of each said strip is parallel to the longitudinal axis of the picture.

In this embodiment, the mono stereoscopic diapositive P is a composite of five pictures instead of being a composite of one picture. For example, the strip $a$ corresponds to one picture, the strip $b$ corresponds to a second picture, the strip $c$ corresponds to a third picture, the strip $d$ corresponds to a fourth picture, and the strip $e$ corresponds to a fifth picture. Likewise, the strips of each picture are each divided into half-strips as previously described, so that the picture comprising the separated areas $a$, is also a mono stereoscopic picture. Each of the elemental strips of each picture may be considered as being divided into two half strips, the width of two half strips corresponding to the opening of the shutter S. The strips are very narrow so that if the observer only sees the strips $a$, the visual impression is the same as if a continuous picture were being viewed.

A shutter S is provided, and this shutter has openings which correspond in width to one of the elemental strips of the picture, and this shutter can be shifted transversely so as to expose any of the composite pictures to the eyes of the observer. The left eye is indicated as "L. E.", and the right eye is indicated as "R. E."

A plurality of cylinders $C_1$, $C_2$, $C_3$, $C_4$, $C_5$ are interposed between the diapositive P and the eyes of the observer.

I prefer to have these cylinders close to the diapositive, so that the distance between the picture and the periphery of each of said cylinders measured along a line parallel to the optical axis, is less than the radius of a cylinder. The said cylinders are preferably all of equal diameter, and they are joined at their adjacent edges, so as to form a single unit. The cylinders may be made of glass, or other suitable material, and a series of them may be formed by suitably shaping a single plate of glass, or celluloid, or other suitable material.

As shown in Fig. 1, the distance between the eyes of the observer and the glass cylinders, measured along a line parallel to the optical axis, is much greater than the diameter of a cylinder.

By properly proportioning the relative distances between the centers of the cylinders, and the diapositive on one side, and between the centers of said cylinders and the eyes of the observer on the other side, the desired effect is secured. That is, the cylinders can be suitably held in position closely adjacent the diapositive, and the eyes of the observer can then be moved to the proper distance. The distance between the eyes of the observer and the cylinders can be varied within substantial limits, without losing the stereoscopic effect desired.

Experience has shown that when a narrow vertical edge is viewed through a closely adjacent and vertically-held cylinder, that a double image is formed, each of these images being seen by one of the eyes of the observer. The right eye can only see the image corresponding thereto, and the left eye can only see the other image.

Hence, when the parts are held in proper position, as shown in Fig. 4, the right eye of the observer can only observe the strips corresponding thereto, and the left eye of the observer can only observe the other strips corresponding thereto, so that a stereoscpic effect is produced.

Likewise, these pictures are magnified.

Figure 2:
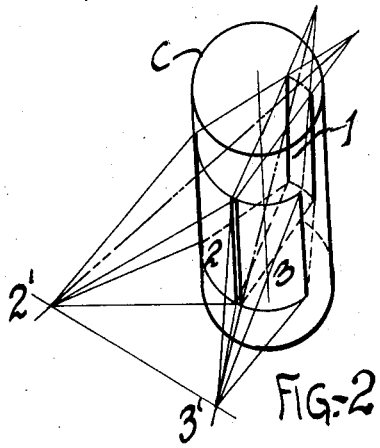
Fig. 2 is a diagrammatic perspective view illustrating the optical principles involved.

For example, as shown in Fig. 2, the left eye of the observer is supposed to be at the point 2' and the right eye of the observer is supposed to be at the point 3'. The actual size of the strip which is being viewed, and which corresponds to the area 1, is magnified, this magnification being indicated by the excess in size of the areas 2 and 3 over the area 1. In the embodiment shown in Fig. 3, the emulsion (that is, the picture) is located upon a cylindrical surface C, instead of being located upon a flat surface, as previously described.

Fig. 5 represents the half strips $a_1$ and $a_2$ of the elemental strips $a$. Likewise, the reference letters $b_1$ and $b_2$ refer to half strips of the elemental strips $b$, the reference letters $c_1$ and $c_2$ indicate half strips of the elemental strips $c$, the reference letters $d_1$ and $d_2$ indicate half strips of the elemental strips $d$, and the reference letters $e_1$ and $e_2$ indicate half strips of the elemental strips $e$.

Figure 3:
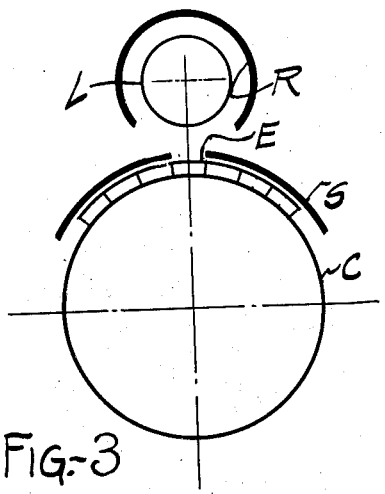
Fig. 3 shows a different embodiment of the invention.

As shown in Fig. 3, the transparent picture which has been formed upon the transparent cylinder C can be viewed by means of a reflector R, and a source of light L. The shutter S may be of circular shape, the same form of shutter being also shown in Fig. 4.

In the embodiment shown in Fig. 6, the strips corresponding to the plurality of composite pictures are located upon the frames X, Y, and Z of a motion picture film. Of course, there should be a suitable relative lateral movement between the film and the group of cylinders or the like, in order to project an undistorted composite picture.

As shown in Fig. 9, the group of cylinders $C_m$ can be reciprocated along a line parallel to the horizontal axis of the diapositive D, so that said cylinders are moved in a plane which is perpendicular to the longitudinal axes of said cylinders.

As shown in Fig. 7, the group of cylinders $C_m$ may be arranged upon a disk which may be rotated in unison with the shutter of a motion picture projector, using the conventional film so that a group of cylinders moves across the line of projection when the shutter is open and the film is held stationary so that a picture thereof is projected through the moving group of cylinders.

In the embodiment shown in Fig. 7, the group of cylinders is large enough to cover the tube through which the light is projected, said tube being indicated in dotted lines. It would not be departing from the invention if said group of cylinders $C_m$ were held stationary in front of the film, while the same was being projected if there is a suitable relative lateral movement between the film, and said group of cylinders.

In the embodiment shown in Fig. 8, a group of prisms $P_m$ is substituted for the group of cylinders and the disc upon which said group of cylinders is mounted can be turned in either direction so as to move across the tube through which the light is projected.

In Fig. 1, it is assumed that the diapositive and the shutter and the group of cylinders are held stationary, while viewing a picture which corresponds to one of the series of elemental strips, such as the series $e$, for example. The diapositive is shifted laterally, when it is desired to view another picture, which corresponds to another series of said strips. To a certain extent, the refracting action of a cylinder corresponds to the refracting action of a double prism. That is, each cylinder can be considered as being divided along a plane which passes through its axis, said plane being perpendicular to the diapositive. Said plane may be considered as including the base of the imaginary double prism. The rays of light are refracted so that they first converge in front of the cylinder at a definite point, and said rays of light then diverge towards the eyes of the observer. Hence, the respective eyes of the observer view different portions of the strips, so that each eye only sees one half of each strip. This produces the stereoscopic effect.

It is an important advantage of my invention that the diapositive need not be made by the slow and expensive method which is specified in French Patent No. 344,522. An ordinary transparent picture can have the group of cylinders placed in front of it, in the manner shown in Fig. 1 for example, and a photograph can be taken of said picture through said group of cylinders and by means of an ordinary photographic printing device so that the print is made through the cylinders. Likewise, the group of cylinders can be placed directly in front of the plate in the camera, when a picture is taken. When the group of cylinders and the shutter S are placed inside the camera, close to the sensitive plate or film, the shutter S protects spaced zones of the sensitive plate or film from exposure. The effect is to photograph upon the plate or film one of the series $a, b, c$, etc. A lateral shift between the sensitive plate or film, and the group of cylinders with the shutter S is then produced, in order to photograph a second series. This is continued until the entire area of the sensitive plate or film has been exposed.

When the plate which is so produced is caused to produce a diapositive by ordinary photographic printing methods, and this diapositive is viewed by transmitted light with the use of said group of cylinders and the shutter, a mono stereoscopic effect is forthwith produced.

The same stereoscopic effect can be produced from an ordinary picture or diapositive which is viewed by transmitted light, by moving a group of cylinders, prisms, or the like, at the proper rate of speed in front of the picture. The movement of the group of cylinders, prisms or the like, may be a reciprocating movement in a plane perpendicular to the axes of the cylinders, or it may be a movement in one direction. The proper rate of speed is to be determined by test in each case. This depends upon the picture, the source of light, and other considerations.

When an ordinary picture has the group of cylinders placed in front thereof and close thereto, it may be assumed, for convenience, that the longitudinal axis of the picture, and also the axes of the cylinders, are held vertical. When the cylinders are held stationary, the observer sees the picture in distorted form, due to the fact that the rays which pass through each cylinder form beams which converge in front of said cylinder and then diverge. However, if the group of cylinders if rapidly moved or reciprocated in a horizontal direction, this distortion is eliminated, and the natural picture is seen with a stereoscopic effect. Due to the effect of persistence of vision, the eye forms a single composite impression of all the light that enters it for a definite period. During this definite period, the group of cylinders has been moved so that each eye has scanned the picture so that each eye has seen each and every point thereon. However, the movement of the cylinders has caused each point to appear to be displaced, alternately to the right and to the left of its true position. The effect is the same as if a suitable series of left-hand and right-hand pictures had been exposed to view.

According to the improvement shown in Figs. 1 and 4, the respective cylinders C can have their longitudinal zones which are directly adjacent the picture, of a red tint on one side of a central perpendicular plane and of a blue or green tint on the other side. The red zone is indicated by W, and the green zone is indicated by Co, it being understood that these contrasting colors can be varied. If an optical system of this kind is placed in front of an ordinary black-and-white diapositive which is illuminated by transmitted light (instead of reflected light), and a negative is taken through an ordinary photographic printing device, this negative may be considered as being composed of very narrow elemental strips or zones, which alternately correspond to the red and to the green tones of the picture. If a diapositive made by means of such a plate is illupositive made by transmitted light and is viewed while the same optical device is held in front of such diapositive, then a marked stereoscopic effect is secured, because the effect is the same (and even better) than if a monostereoscopic plate were made by the slow and expensive method shown in French Patent No. 344522.

An ordinary picture may be considered as being composed of a series of elemental strips or zones. As previously pointed out, an ordinary picture can be utilized and the stereoscopic effect can be secured by moving the group of refracting bodies with respect to the picture.

Referring to Fig. 9, it is assumed that the picture is being displayed by means of transmitted light, in the form of parallel beams. These parallel beams pass through the picture and they pass through the refracting members $Cm$ which which are located in front of the picture. Each of these refracting members may be considered as corresponding to the portion of the picture which is directly behind said refracting member. Each of said refracting members $Cm$ may be considered as being divided into two halves or parts by means of a plane which is perpendicular to the picture, and which passes through the axis of said refracting member. The two halves of each refracting member cause the corresponding beams of light to diverge from a point which is located in front of the picture, said point being also located in front of said refracting members. When the set of refracting members is at rest, this causes the picture to be distorted, if it is an ordinary picture. Each eye sees a different partial view of the picture. However, when the refracting members are moved with sufficient rapidity in a direction perpendicular to their axes, the distortion is eliminated and the picture is displayed in its undistorted form, while the effect or illusion of depth is secured. This is due to the fact that the views of the picture are in the form of a rapid succession, and said succeeding partial views, in their entirety, include the whole picture. If a projection machine is used, the picture is also displayed by this method. Each point of the picture is thus displayed as though it were being rapidly shifted from its true position, and preferably in opposite directions from its true position.

I claim:

1. A method of displaying a picture, which consists in placing close to said picture a series of cylinders, while illuminating said picture by transmitted light, and rapidly moving said cylinders, said cylinders being moved in a direction perpendicular to their axes.

2. A composite picture having a plurality of series, of strips, each said series corresponding to a single picture and each said series corresponding to a monostereoscopic picture, each strip being separated from the adjacent strips of its series by intermediate strips of other series, a screen in front said composite picture and having slots which correspond to one of said series, and cylindrical elements in front of said slots.

3. A method of displaying a light-permeable picture which consists in causing rays of light to pass through the picture, and refracting the rays of light in front of the picture by moving light-refracting means relative to said picture, so that the refracted beam of light which corresponds to a point of the picture is caused to assume successive opposite inclinations with respect to a line which is perpendicular to said picture, while said point is being viewed said beam of light being substantially maintained in a predetermined plane while it is being turned, the turning being accomplished with sufficient rapidity in order to display the picture in substantially undistorted form and to secure the appearance of depth.

4. A method of displaying a picture which consists in rapidly inclining the light beam which emanates from a point of said picture by moving light-refracting means relative to said picture, so that said light beam assumes successive opposite inclinations to a line which is perpendicular to the plane of said picture while said point is being viewed, said light beam being substantially maintained in a predetermined plane while it is being inclined, said light beam being so successively inclined with sufficient rapidity to display the picture in substantiall undistorted form and to secure the appearance of depth.

5. A method of displaying a light-permeable picture which consists in passing light through the picture and viewing the picture by said transmitted light, while rapidly inclining the light beam which is transmitted through a point of said picture while said point is being viewed, so that said light beam assumes successive opposite inclinations to a line which is perpendicular to the plane of said picture, said light beam being substantially maintained in a predetermined plane while it is being inclined, said light beam being so successively inclined with sufficient rapidity in order to display the picture in substantially undistorted form and to secure the appearance of depth, said light beam being so inclined by causing it to pass through light-refracting means which are moved relative to said picture.

JACOB DENINSON.